(12) United States Patent
Nakano et al.

(10) Patent No.: US 11,016,064 B2
(45) Date of Patent: May 25, 2021

(54) REFRIGERANT INTRODUCER AND GAS CHROMATOGRAPH

(71) Applicant: Shimadzu Corporation, Kyoto (JP)

(72) Inventors: Shigenobu Nakano, Kyoto (JP); Yuki Komori, Kyoto (JP); Masayuki Okada, Kyoto (JP)

(73) Assignee: Shimadzu Corporation, Kyoto (JP)

(*) Notice: Subject to any disclaimer, the term of this patent is extended or adjusted under 35 U.S.C. 154(b) by 212 days.

(21) Appl. No.: 16/032,406

(22) Filed: Jul. 11, 2018

(65) Prior Publication Data

US 2019/0025262 A1 Jan. 24, 2019

(30) Foreign Application Priority Data

Jul. 21, 2017 (JP) .............................. JP2017-141919

(51) Int. Cl.
*B01D 53/02* (2006.01)
*G01N 30/30* (2006.01)
*G01N 30/54* (2006.01)
*G01N 30/12* (2006.01)
*G01N 30/68* (2006.01)
(Continued)

(52) U.S. Cl.
CPC ............. *G01N 30/30* (2013.01); *G01N 30/12* (2013.01); *G01N 30/54* (2013.01); *G01N 30/68* (2013.01);
(Continued)

(58) Field of Classification Search
CPC ....... G01N 2030/025; G01N 2030/121; G01N 2030/3007; G01N 2030/3084;
(Continued)

(56) References Cited

U.S. PATENT DOCUMENTS 3,305,000 A 2/1967 Bullen et al.
4,111,643 A 9/1978 Welland
(Continued)

FOREIGN PATENT DOCUMENTS

DE 24 00 389 A1 7/1975
DE 28 07 621 A1 8/1978
(Continued)

OTHER PUBLICATIONS

Extended European Search Report dated Dec. 14, 2018, including the European Search Report and the European Search Opinion, in connection with corresponding EP Application No. 18184174.3 (8 pgs.).
(Continued)

*Primary Examiner* — Christopher P Jones
(74) *Attorney, Agent, or Firm* — Maier & Maier, PLLC

(57) ABSTRACT

A controller includes a temperature prediction unit. The temperature prediction unit predicts, on the assumption that a refrigerant is fed from a refrigerant feeder, an internal temperature of a column oven based on time interval information and decrement information in a memory. Thus, the temperature prediction unit can accurately predict the internal temperature of the column oven when the refrigerant is fed from the refrigerant feeder. If the refrigerant is fed from the refrigerant feeder when the predicted internal temperature of the column oven is suitable for the analysis operation, the internal temperature of the column oven can be brought closer to an appropriate temperature. As a result, the internal temperature of the column oven can be controlled with precision.

11 Claims, 9 Drawing Sheets

(51) Int. Cl.
*G01N 30/78* (2006.01)
*G01N 30/02* (2006.01)

(52) U.S. Cl.
CPC ....... *G01N 30/78* (2013.01); *G01N 2030/025* (2013.01); *G01N 2030/121* (2013.01); *G01N 2030/3007* (2013.01); *G01N 2030/3084* (2013.01); *G01N 2030/685* (2013.01)

(58) Field of Classification Search
CPC .. G01N 2030/685; G01N 30/12; G01N 30/30; G01N 30/54; G01N 30/68; G01N 30/78
See application file for complete search history.

(56) References Cited

U.S. PATENT DOCUMENTS 4,530,705 A * 7/1985 Firey ...................... B01D 53/04
96/116
5,271,230 A * 12/1993 Spiess ...................... B01L 7/00
62/223
5,402,668 A 4/1995 Murakami et al.

FOREIGN PATENT DOCUMENTS

| | | |
|---|---|---|
| DE | 91 10 762.8 U1 | 1/1992 |
| JP | S60-165864 U | 11/1985 |
| JP | H06-341751 A | 12/1994 |
| JP | H10-048191 A | 2/1998 |
| JP | 2003-207246 | 7/2003 |

OTHER PUBLICATIONS

Japanese Office Action dated Oct. 27, 2020, in connection with corresponding JP Application No. 2017-141919 (6 pp., including machine-generated English translation).

* cited by examiner

FIG.5A

| TIME INTERVAL | 100msec | 200msec | 300msec | 400msec | 500msec | ... |
|---|---|---|---|---|---|---|
| DECREMENT | | | | | | ... |

FIG.5B

| TIME INTERVAL | 100msec | 200msec | 300msec | 400msec | 500msec | ... |
|---|---|---|---|---|---|---|
| DECREMENT | 1.2℃ | — | — | — | — | ... |

FIG.5C

| TIME INTERVAL | 100msec | 200msec | 300msec | 400msec | 500msec | ... |
|---|---|---|---|---|---|---|
| DECREMENT | 1.2℃ | — | 1.6℃ | — | — | ... | ized # REFRIGERANT INTRODUCER AND GAS CHROMATOGRAPH

CROSS-REFERENCE TO RELATED APPLICATION

This application claims priority to Japanese Patent Application No. 2017-141919 filed on Jul. 21, 2017, the entire disclosure of which is incorporated by reference herein.

BACKGROUND

The present disclosure relates to a refrigerant introducer for cooling a cooling target, and a gas chromatograph including the refrigerant introducer.

A gas chromatograph including a refrigerant introducer has been known. The refrigerant introducer introduces a refrigerant into a column oven, which is a cooling target, to cool the inside of the column oven. To perform an analysis operation, a heater provided in the column oven is operated, and a refrigerant is introduced by the refrigerant introducer so that an internal temperature of the column oven approaches a preset temperature (see, e.g., Japanese Unexamined Patent Publication No. H10-48191).

According to the gas chromatograph of Japanese Unexamined Patent Publication No. H10-48191, a temperature sensor for temperature detection is provided in the column oven, and a valve controlling the feed rate of the refrigerant is provided for the refrigerant introducer. If the temperature sensor detects that the internal temperature of the column oven is higher than the preset temperature with a considerable difference, the valve is further opened. As the internal temperature of the column oven detected by the temperature sensor approaches the preset temperature, control is made to gradually close the valve.

In this manner, the gas chromatograph of Japanese Unexamined Patent Publication No. H10-48191 performs so-called feedback control, i.e., controls the opening of the valve in accordance with the preset temperature and the actual internal temperature of the column oven.

SUMMARY

According to the existing gas chromatograph described above, the internal temperature of the column oven has been hard to stabilize during the cooling.

Specifically, the refrigerant introducer includes a refrigerant cylinder, and a feed pipe connected to the cylinder and the column oven. When the valve is opened, the refrigerant in the cylinder is fed into the column oven. The amount of the refrigerant remaining in the cylinder and the temperature of the cylinder vary depending on usage and an operating environment of the refrigerant introducer. Thus, the feeding pressure of the refrigerant may vary, which fluctuates the feed rate of the refrigerant even if the opening of the valve is fixed. As a result, the opening of the valve cannot be controlled uniformly, and the internal temperature of the column oven is hard to become stable.

Further, there is a time lag between when the refrigerant is introduced into the column oven and when the ambient temperature of the temperature sensor is reduced by the refrigerant thus introduced. This is disadvantageous because the internal temperature of the column oven is further hard to become stable.

For example, even if a required amount of the refrigerant is introduced into the column oven, the ambient temperature of the temperature sensor is not fully reduced (does not become stable) just after the introduction of the refrigerant. Thus, if the refrigerant is kept introduced into the column oven based on the temperature detected by the temperature sensor, the refrigerant is introduced more than necessary into the column oven until the detected temperature reaches the preset temperature. Even if the introduction of the refrigerant is stopped thereafter, the ambient temperature of the temperature sensor further decreases, and eventually, becomes considerably lower than the preset temperature. Thus, the gas chromatograph configured as described above cannot easily stabilize the internal temperature of the column oven.

In view of the foregoing, the present disclosure has been achieved to provide a refrigerant introducer which enables precise control of the temperature of a cooling target, and a gas chromatograph including the refrigerant introducer.

(1) A refrigerant introducer according to the present disclosure cools a cooling target provided for a gas chromatograph. The refrigerant introducer includes a refrigerant feeder, a memory, and a temperature prediction unit. The refrigerant feeder intermittently feeds a refrigerant to the cooling target at predetermined time intervals. The memory stores, and associates with one another, the time intervals and a decrement of a temperature of the cooling target when the refrigerant has been fed to the cooling target at the time intervals. The temperature prediction unit predicts the temperature of the cooling target based on a relationship between the time intervals and the decrement stored in the memory.

In this configuration, the temperature prediction unit predicts, on the assumption that the refrigerant is fed from the refrigerant feeder, the temperature of the cooling target based on the time intervals at which the refrigerant feeder feeds the refrigerant and the decrement of the temperature of the cooling target caused by the feeding.

Thus, the temperature prediction unit can accurately predict the temperature of the cooling target in a situation where the refrigerant is fed from the refrigerant feeder.

If the predicted temperature of the cooling target is suitable for an analysis operation, the feeding of the refrigerant from the refrigerant feeder can bring the temperature of the cooling target closer to an appropriate temperature.

As a result, the temperature of the cooling target can be controlled with precision.

(2) The refrigerant introducer may further include a cooling controller. The cooling controller controls the feeding of the refrigerant from the refrigerant feeder to the cooling target based on the temperature of the cooling target predicted by the temperature prediction unit.

This control can allow an appropriate amount of the refrigerant to be fed to the cooling target as compared to the case where the feed rate of the refrigerant is adjusted through the conventional feedback control.

As a result, the temperature of the cooling target can be controlled with precision.

(3) The cooling controller may periodically determine whether to feed the refrigerant or not, and determine to postpone the feeding of the refrigerant from the refrigerant feeder to the cooling target if the temperature of the cooling target predicted by the temperature prediction unit does not fall within an allowable range.

In this configuration, if the temperature of the cooling target predicted by the temperature prediction unit does not fall within the allowable range, it is determined to postpone the feeding of the refrigerant so that the refrigerant is not fed. On the other hand, if the temperature of the cooling target predicted by the temperature prediction unit falls within the allowable range, it is determined to feed the refrigerant so that the refrigerant can be fed.

This can allow the refrigerant to be fed to the cooling target at an appropriate time.

(4) The refrigerant introducer may further include a memory processing unit. The memory processing unit allows the memory to store, and associate with one another, the time intervals extended due to the postponed feeding of the refrigerant, and the decrement of the temperature of the cooling target when the refrigerant has been fed to the cooling target at the extended time intervals.

In this configuration, the memory can store the time intervals at which the refrigerant is fed, and the decrement through the feeding of the refrigerant in real time during an analysis operation. Further, the temperature of the cooling target can accurately be predicted because the temperature prediction unit predicts the temperature of the cooling target based on the time intervals and the decrement stored in real time in the memory.

(5) A gas chromatograph of the present disclosure includes the refrigerant introducer, a column oven, which is the cooling target, a column, and a temperature detector. The column oven receives the refrigerant introduced from the refrigerant introducer. The column is disposed in the column oven. The temperature detector detects an internal temperature of the column oven.

In this configuration, an analysis operation can be performed while the refrigerant introducer precisely controls the internal temperature of the column oven.

Therefore, an accurate analysis can be performed.

(6) The refrigerant feeder may include a feed pipe. The feed pipe extends in the column oven toward the vicinity of the column, and has a discharge port through which the refrigerant is discharged.

In this configuration, the inside of the column oven is cooled by the feed pipe containing the refrigerant. The refrigerant fed into the column oven via the feed pipe further cools the column oven. That is, the inside of the column oven is cooled stepwise by the feed pipe itself, and the refrigerant fed via the feed pipe.

As a result, the internal temperature of the column oven can be controlled with precision by the refrigerant introducer.

In this configuration, the inside of the column oven is abruptly cooled through the mere feeding of a small amount of the refrigerant. Thus, the prediction by the temperature prediction unit becomes more effective.

(7) The gas chromatograph may further include a heater. The heater is disposed in the column oven to heat the inside of the column oven. The feed pipe may extend between the heater and the column.

The configuration allows the feed pipe containing the refrigerant to cool a region between the heater and the column.

(8) Further, the feed pipe may be curved in the vicinity of the column.

This configuration allows the feed pipe containing the refrigerant to efficiently cool the atmosphere around the column.

(9) Moreover, the feed pipe may be curved to correspond to a shape of the column.

This configuration allows the feed pipe containing the refrigerant to efficiently cool the column itself.

According to the present disclosure, the temperature prediction unit predicts, on the assumption that the refrigerant is fed from the refrigerant feeder, the temperature of the cooling target based on the time intervals at which the refrigerant feeder feeds the refrigerant and the decrement of the temperature of the cooling target caused by the feeding. Thus, the temperature prediction unit can accurately predict the temperature of the cooling target in a situation where the refrigerant is fed from the refrigerant feeder. If the predicted temperature of the cooling target is suitable for an analysis operation, the feeding of the refrigerant from the refrigerant feeder can bring the temperature of the cooling target closer to an appropriate temperature. As a result, the temperature of the cooling target can be controlled with precision.

BRIEF DESCRIPTION OF THE DRAWINGS

FIG. 5A conceptually illustrates a temperature variation table stored in a memory, showing the state before the start of the feeding of a refrigerant.

FIG. 5B conceptually illustrates a temperature variation table stored in a memory, showing the state where information is stored in response to the periodical feeding of a refrigerant.

FIG. 5C conceptually illustrates a temperature variation table stored in a memory, showing the state where information is stored in response to the feeding of a refrigerant after the feeding of the refrigerant is once postponed.

DETAILED DESCRIPTION

1. Configuration of Gas Chromatograph

Figure 1:
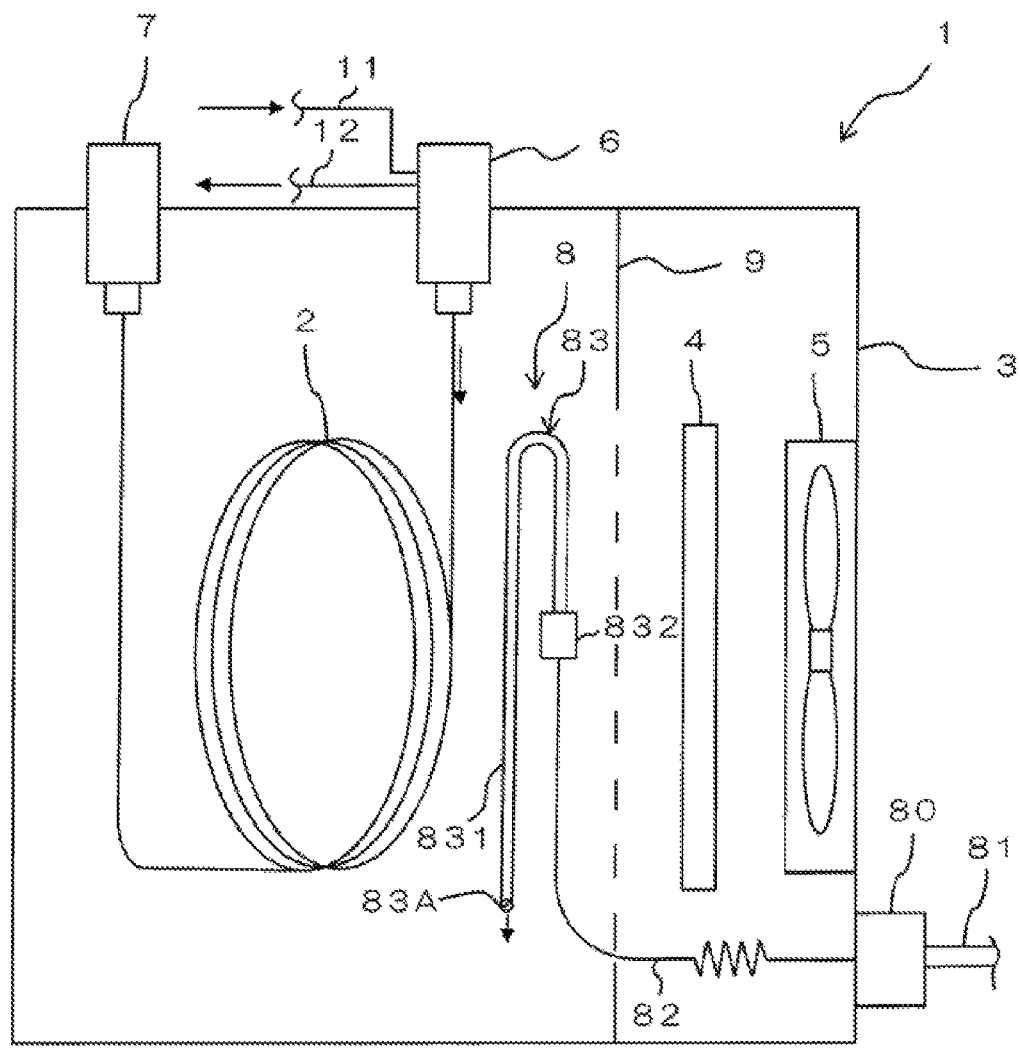
FIG. 1 schematically illustrates an example of a configuration of a gas chromatograph according to a first embodiment of the present disclosure.

FIG. 1 schematically illustrates an example of a configuration of a gas chromatograph according to a first embodiment of the present disclosure.

A gas chromatograph 1 performs an analysis by feeding a carrier gas and a sample gas into a column 2. In addition to the column 2, the gas chromatograph 1 further includes a column oven 3, a heater 4, a fan 5, a sample introducer 6, a detector 7, and a refrigerant feeder 8.

The column 2 is housed in the column oven 3. The column 2 may be comprised of, for example, a capillary column.

The column oven 3 is in the shape of a box. The column oven 3 is an example of a cooling target.

The heater 4 is disposed in the column oven 3 to heat the inside of the column oven 3. The heater 4 is spaced from the column 2. A partition 9 is provided in the column oven 3 between the column 2 and the heater 4. The partition 9 is provided with holes through which the air passes, or a portion of the refrigerant feeder 8 passes.

The fan 5 is disposed in the column oven 3. The fan 5 is arranged on the side of the heater 4 opposite to the column 2. The fan 5 is arranged in a rear portion of the gas chromatograph 1, while the column 2 is arranged is a front portion of the gas chromatograph 1.

The sample introducer 6 introduces the carrier gas and the sample gas into the column 2, and forms therein a sample vaporizing chamber (not shown). A liquid sample is injected, and vaporized, in the sample vaporizing chamber, and then introduced into the column 2 together with the carrier gas. A gas feed channel 11 and a split channel 12 communicate with the sample vaporizing chamber.

The gas feed channel 11 allows the carrier gas to be fed into the sample vaporizing chamber of the sample introducer 6.

The split channel 12 allows a portion of the gas (a gas mixture of the carrier gas and the sample gas) in the sample vaporizing chamber to be discharged at a predetermined split ratio when the carrier gas and the sample gas are introduced into the column 2 by split injection.

The detector 7 is comprised of, for example, a flame ionization detector (FID), or a flame photometric detector (FPD). The detector 7 sequentially detects sample components contained in the carrier gas introduced from the column 2.

The refrigerant feeder 8 feeds the refrigerant into the column oven 3 to cool the inside of the column oven 3. The refrigerant fed from the refrigerant feeder 8 is, for example, coolant gas such as a $N_2$ gas, or a $CO_2$ gas. The refrigerant feeder 8 is partially disposed in the column oven 3. Detailed structure of the refrigerant feeder 8 will be described later.

To measure a sample with the gas chromatograph 1, a sample to be analyzed is first injected into the sample introducer 6. The sample is vaporized in the sample vaporizing chamber. The carrier gas is fed into the sample vaporizing chamber of the sample introducer 6 via the gas feed channel 11.

The sample vaporized in the sample vaporizing chamber is introduced into the column 2 together with the carrier gas. After the introduction of the sample into the column 2, the heater 4 and the fan 5 are driven to heat the inside of the column oven 3. Thus, the internal temperature of the column oven 3 gradually increases. The sample components contained in the sample are separated as the sample passes through the column 2, and are sequentially introduced into the detector 7.

Then, the detector 7 sequentially detects the sample components contained in the carrier gas introduced from the column 2. The gas chromatograph 1 generates a chromatogram based on a detection signal from the detector 7. A user checks the chromatograph thus obtained to perform analyses. After the chromatograph is checked, high temperature air is discharged out of the system, and the column oven 3 is cooled to an initial temperature.

During this analysis operation, the refrigerant feeder 8 appropriately feeds the refrigerant into the column oven 3. Thus, the column oven 3 is cooled (temperature-controlled) to a predetermined (target) temperature. In this manner, during the analysis operation by the gas chromatograph 1, the refrigerant feeder 8 controls the internal temperature of the column oven 3.

2. Configuration of Refrigerant Feeder

The refrigerant feeder 8 includes a flow rate control valve 80, an external feed pipe 81, a resistance pipe 82, and an internal feed pipe 83.

The flow rate control valve 80 is provided for a sidewall (rear wall) of the column oven 3. The flow rate control valve 80 controls the flow rate of the refrigerant. The external feed pipe 81 and the resistance pipe 82 are connected to the flow rate control valve 80. Specifically, the flow rate control valve 80 is interposed between the external feed pipe 81 and the resistance pipe 82. The opening of the flow rate control valve 80 is controlled by a controller 33 which will be described later.

The external feed pipe 81 is disposed outside the column oven 3. The external feed pipe 81 has a downstream end connected to the flow rate control valve 80. Although not shown, an upstream end of the external feed pipe 81 is connected to a reservoir unit such as a cylinder storing the refrigerant. The refrigerant is fed from the reservoir unit.

The resistance pipe 82 is disposed inside the column oven 3. The resistance pipe 82 has an upstream end connected to the flow rate control valve 80. The resistance pipe 82 is a tubular member having a flow resistance corresponding to its length. The resistance pipe 82 has a smaller inner diameter than the internal feed pipe 83.

The internal feed pipe 83 is disposed inside the column oven 3. Specifically, the internal feed pipe 83 is disposed (extends) between the column 2 and the heater 4, in particular, between the column 2 and the partition 9. The internal feed pipe 83 is an example of a feed pipe.

Figure 2:
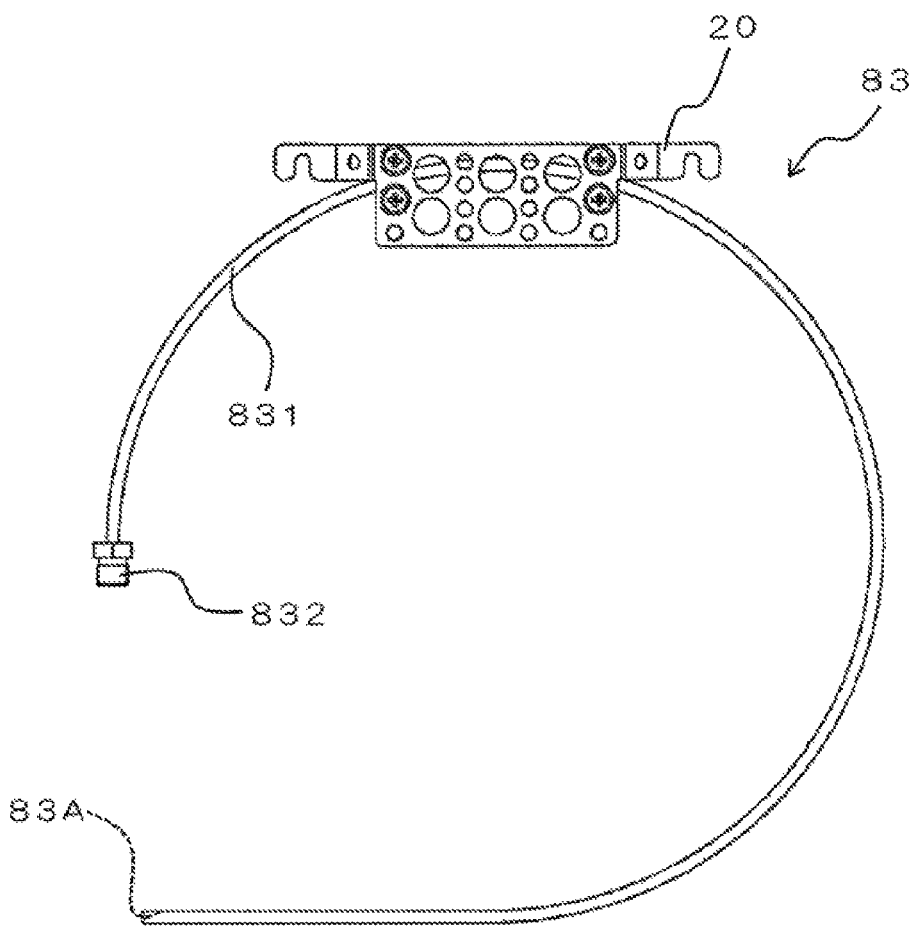
FIG. 2 is a front view illustrating an internal feed pipe used in the gas chromatograph of FIG. 1.

FIG. 2 is a front view illustrating the internal feed pipe 83.

The internal feed pipe 83 is curved (arc-shaped). The internal feed pipe 83 includes a tube 831 and a joint 832.

The tube 831 is a tubular member. The tube 831 is curved in the shape of an arc from an upstream end to a middle portion thereof, and extends straight from the middle portion (a portion slightly downward from the middle portion) to its downstream end. Specifically, the tube 831 has an arc-shaped portion and a straight portion. The downstream end (an end of the straight portion) of the tube 831 forms therein a discharge port 83A. The middle portion of the tube 831 is held by a fixing member 20. The joint 832 is attached to the upstream end of the tube 831.

The joint 832 is a cylindrical member. Space inside the joint 832 communicates with space inside the tube 831. A tip end (an upstream end) of the joint 832 is configured to allow the resistance pipe 82 to be attached thereto (in a detachable manner).

Although not shown in FIG. 1, the fixing member 20 is attached to the partition 9. The fixing member 20 holds the internal feed pipe 83 (the tube 831). Thus, the internal feed pipe 83 is held to be disposed between the partition 9 and the column 2. In this state, the downstream end of the internal feed pipe 83 is situated in a lower portion in the column oven 3. The discharge port 83A of the internal feed pipe 83 is oriented in the horizontal direction. Thus, the refrigerant discharged from the discharge port 83A is not directly sprayed onto the column 2, but hits an inner wall of the column oven 3 to be spread inside the column oven 3.

The internal feed pipe 83, being held in the column oven 3, is provided adjacent to the column 2. Specifically, the internal feed pipe 83 is disposed behind the column 2 at a distance from the column 2. The shape of the internal feed pipe 83 corresponds to the shape of the column 2. Specifically, the outer shape of the internal feed pipe 83 is as large as that of the column 2, and thus, the internal feed pipe 83 and the column 2 are aligned with each other when viewed from the front.

As shown in FIG. 1, the refrigerant is fed from the external feed pipe 81 toward the inside of the column oven 3. The refrigerant that has passed through the external feed pipe 81 passes through the flow rate control valve 80, and flows into the resistance pipe 82. Then, passing through the resistance pipe 82, the refrigerant flows into the internal feed pipe 83, and is discharged from the discharge port 83A toward the lower portion of the column oven 3.

After the flow rate control by the resistance pipe 82 in this manner, the refrigerant is discharged from the discharge port 83A of the internal feed pipe 83. Then, the inside of the column oven 3 is cooled by the refrigerant. At this time, the inside of the column oven 3 is cooled not only by the refrigerant, but also by the internal feed pipe 83 containing the refrigerant. That is, the inside of the column oven 3 is cooled stepwise by the internal feed pipe 83 and the refrigerant.

3. Electrical Configuration of Controller and Peripheral Components

Figure 3:
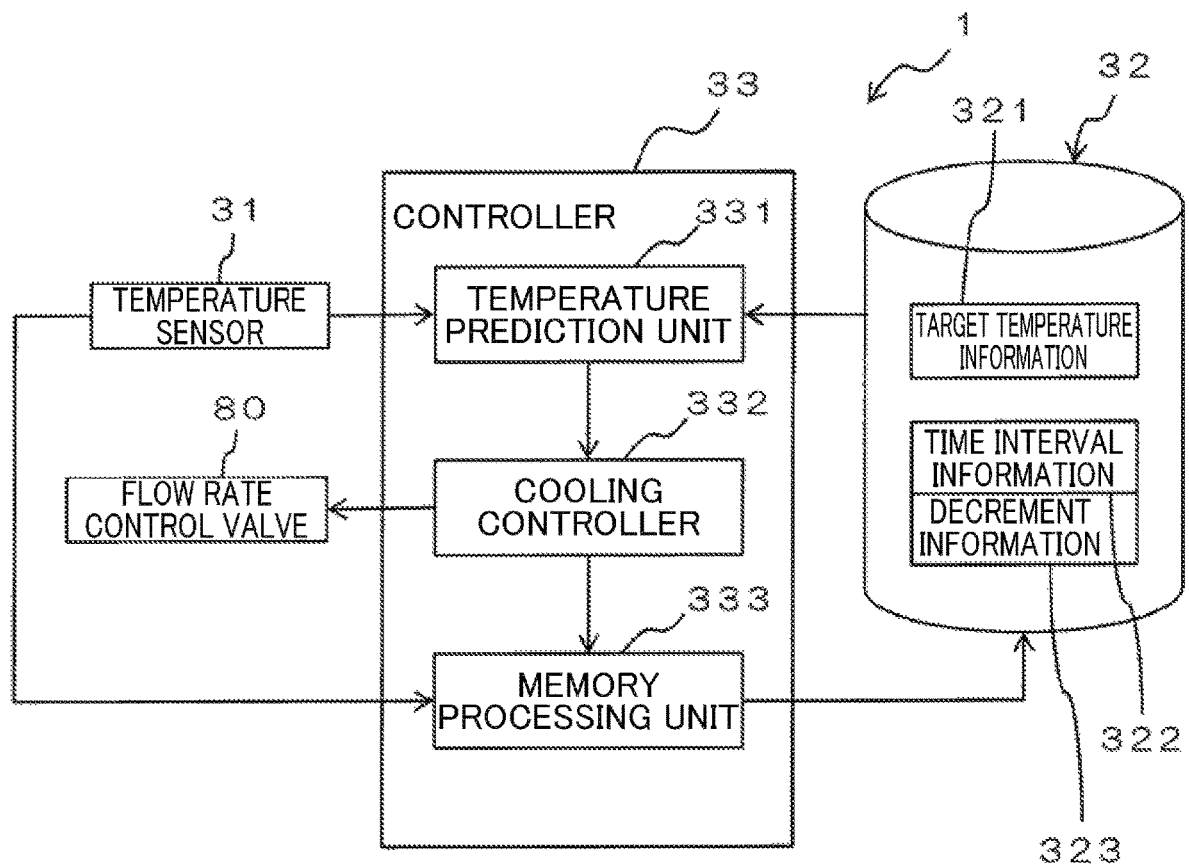
FIG. 3 is a block diagram illustrating an electrical configuration of a controller and its peripheral components.

FIG. 3 is a block diagram illustrating an electrical configuration of a controller and peripheral components.

The gas chromatograph 1 includes, in addition to the flow rate control valve 80, a temperature sensor 31, a memory 32, and the controller 33.

Although not shown in FIG. 1, the temperature sensor 31 is disposed inside the column oven 3, and detects the internal temperature of the column oven 3. The temperature sensor 31 is an example of a temperature detector.

The memory 32 is comprised of, for example, a read only memory (ROM), or a random access memory (RAM). The memory 32 stores items of information, such as target temperature information 321, time interval information 322, and decrement information 323.

The target temperature information 321 is information about the target internal temperature of the column oven 3 during the analysis operation. Specifically, the target temperature information 321 is information about a preset temperature for the analysis operation used as a reference value for the temperature control. The memory 32 stores in advance the target temperature information 321. A user may manually enter the target temperature information 321 in the memory 32 via an operating unit (not shown).

The time interval information 322, which will be described in detail later, is information about time intervals at which the refrigerant is intermittently (periodically) fed into the column oven 3 by the refrigerant feeder 8.

The decrement information 323, which will be described in detail later, is information about a decrement of the temperature that occurs when the refrigerant is fed into the column oven 3 by the refrigerant feeder 8. The decrement information 323 is stored in association with the time interval information 322.

The controller 33 includes, for example, a central processing unit (CPU). The controller 33 is electrically connected to the temperature sensor 31, the memory 32, the flow rate control valve 80, and other components. The controller 33 functions as a temperature prediction unit 331, a cooling controller 332, or a memory processing unit 333, in accordance with a program executed by the CPU.

The temperature prediction unit 331 predicts, on the assumption that the refrigerant is fed into the column oven 3 by the refrigerant feeder 8, the internal temperature of the column oven 3 based on the internal temperature of the column oven 3 detected by the temperature sensor 31 and various information items stored in the memory 32.

The cooling controller 332 controls the opening of the flow rate control valve 80 based on the internal temperature of the column oven 3 predicted by the temperature prediction unit 331.

In response to the opening control of the flow rate control valve 80 by the cooling controller 332, the memory processing unit 333 stores a decrement of the internal temperature of the column oven 3 detected by the temperature sensor 31 in the memory 32 as the decrement information 323. At this time, the memory processing unit 333 stores, in the memory 32, the decrement information 323 in association with the time interval information 322 as will be described later.

4. Variation of Internal Temperature of Column Oven 3

Figure 4:
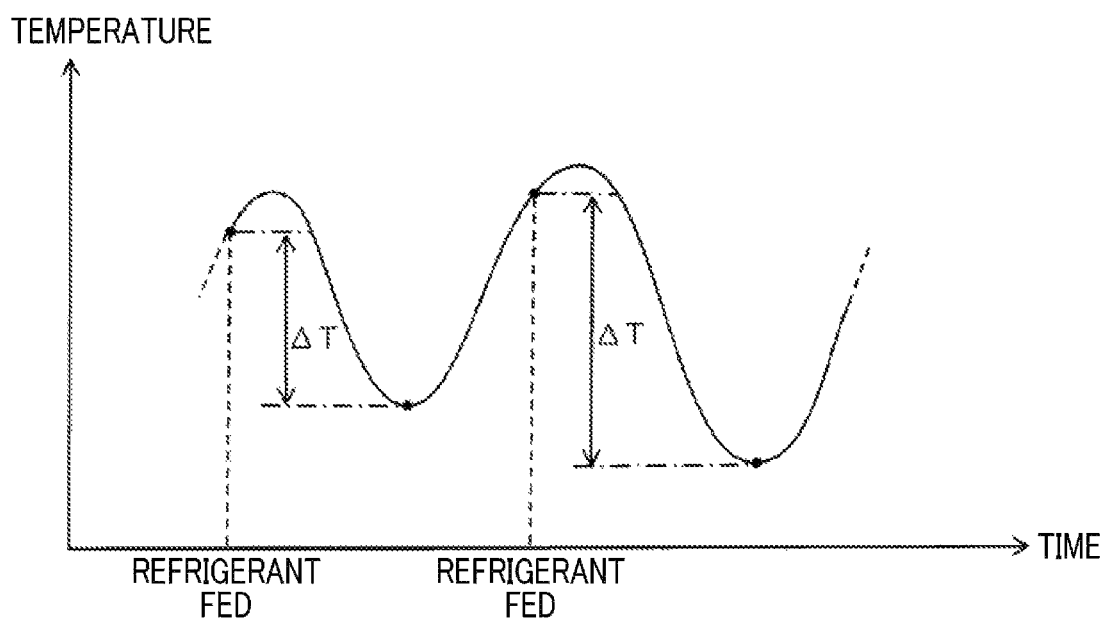
FIG. 4 is a graph illustrating variations in temperature in a column oven with time.

FIG. 4 is a graph illustrating variations in internal temperature of the column oven 3 with time.

In the gas chromatograph 1, as will be described later, the refrigerant is intermittently (periodically) fed from the refrigerant feeder 8 into the column oven 3.

FIG. 4 shows the variations in internal temperature of the column oven 3 with time along with the intermittent feedings. In this case, the internal temperature of the column oven 3 repeatedly rises and falls. In this example, a value $\Delta T$ of the decrement of the internal temperature of the column oven 3 detected by the temperature sensor 31 is calculated, based on which the control is performed as will be described later. Specifically, in this example, a difference between the internal temperature of the column oven 3 when the refrigerant is being fed and the minimum internal temperature of the column oven 3 after the feeding of the refrigerant is calculated as the value $\Delta T$ at any time. The value $\Delta T$ is stored as the decrement information 323 in the memory 32.

5. Temperature Variation Table

FIG. 5A conceptually illustrates a temperature variation table stored in the memory 32, showing the state before the feeding of the refrigerant starts.

In the temperature variation table of FIG. 5A, information about the time intervals between the intermittent feedings of the refrigerant is entered in an upper row, and information about the temperature decrement is stored at any time in a lower row. The information in the upper row of the temperature variation table corresponds to the time interval information 322 of the memory 32. The information in the lower row of the temperature variation table is that of the decrement $\Delta T$ of the internal temperature of the column oven 3, and corresponds to the decrement information 323 of the memory 32. The temperature variation table stores the information of the decrement $\Delta T$ in the lower row under the predetermined time interval so that these information items are associated with each other.

Before the intermittent feeding of the refrigerant into the column oven 3 starts, the temperature variation table does not store any information of the decrement $\Delta T$ of the internal temperature of the column oven 3 (the row is blank) as shown in FIG. 5A, and no decrement information 323 is stored in the memory 32.

6. Control by Controller

Figure 6:
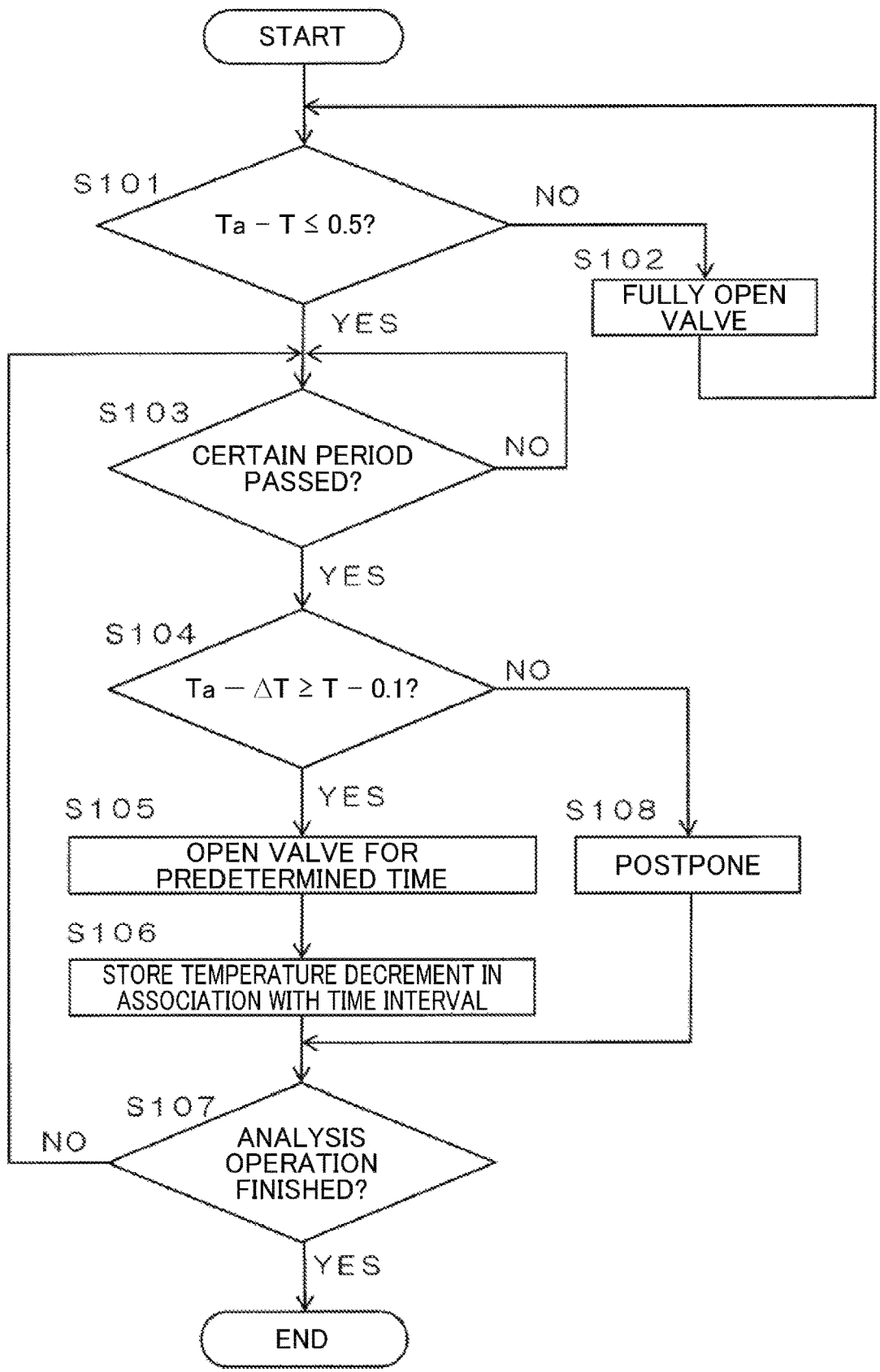
FIG. 6 is a flowchart illustrating an example of control performed by a controller.

FIG. 6 is a flowchart illustrating an example of control performed by a controller 33.

Once the gas chromatograph 1 starts the analysis operation, the temperature prediction unit 331 determines whether the actual internal temperature Ta of the column oven 3 detected by the temperature sensor 31 is different by 0.5° C. or less from the value of the target temperature information 321 (target temperature T) stored in the memory 32. If the difference between the temperature Ta and the target temperature T exceeds 0.5° C. (the answer is NO in Step S101), the temperature prediction unit 331 determines that the internal temperature of the column oven 3 is high. If the temperature prediction unit 331 determines that the internal temperature of the column oven 3 is high, the cooling controller 332 allows the flow rate control valve 80 to fully open (Step S102). Then, a large amount of refrigerant is fed into the column oven 3.

As a result, the inside of the column oven 3 is cooled, i.e., the internal temperature decreases. If the difference between the temperature Ta and the target temperature T still exceeds 0.5° C., the flow rate control valve 80 is kept fully open.

If the difference between the temperature Ta and the target temperature T is less than or equal to 0.5° C. (the answer is YES in Step S101), the temperature prediction unit 331 periodically performs the prediction of the internal temperature of the column oven 3 to determine whether the result of the prediction is less than or equal to a predetermined value. Specifically, the temperature prediction unit 331 makes the determination based on the following formula (1) every certain period of time, e.g., 100 msec in this example (the answer is YES in Step S103).

$$Ta-\Delta T \geq T-0.1 \quad (1)$$

In the formula (1), ΔT represents the value of the decrement of the internal temperature of the column oven 3 when the refrigerant is intermittently fed as described above, and is shown in the lower row of the temperature variation table of FIG. 5A (the value of the decrement information 323 stored in the memory 32). Specifically, the temperature prediction unit 331 extracts the value ΔT from the temperature variation table of FIG. 5A, and substitutes the value ΔT into the formula (1) for the determination.

When the determination of Step S104 is performed first, the intermittent feeding of the refrigerant is not started yet, and thus, the memory 32 stores no decrement information 323. Thus, as shown in FIG. 5A, the temperature variation table stores no information in the lower row (has no information about the value ΔT). If the temperature variation table has no information to be referred to, the temperature prediction unit 331 substitutes the value ΔT, which is zero, into the formula (1) for the determination.

Specifically, the temperature prediction unit 331 refers to the decrement information associated with 100 msec, which is time elapsed, in the temperature variation table. In this example, there is no decrement information associated with 100 msec. Thus, zero is substituted for ΔT in the formula (1). Further, the temperature prediction unit 331 substitutes the actual internal temperature Ta of the column oven 3 and the target temperature T stored in the memory 32 into the formula (1).

Then, the temperature prediction unit 331 determines whether the temperature Ta (left-hand value of the formula (1)) is more than or equal to a value (right-hand value of the formula (1)) obtained by subtracting 0.1° C. only from the target temperature. If the temperature Ta (left-hand value of the formula (1)) is more than or equal to the value (right-hand value of the formula (1)) obtained by subtracting 0.1° C. only from the target temperature (the answer is YES in Step S104), the cooling controller 332 determines to feed the refrigerant.

As can be seen, the temperature prediction unit 331 determines whether the internal temperature Ta of the column oven 3 is more than or equal to a reference value, which is the value obtained by subtracting 0.1° C. only from the target temperature. Then, if the internal temperature Ta is more than or equal to the reference value, the cooling controller 332 determines to feed the refrigerant.

In response to the determination to feed the refrigerant, the cooling controller 332 opens the flow rate control valve 80 only for a predetermined time (Step S105). In this example, the cooling controller 332 opens the flow rate control valve 80 only for 20 msec in the period of 100 msec, for example.

The memory processing unit 333 calculates, as a value ΔT, the difference between the internal temperature of the column oven 3 during the feeding of the refrigerant and the minimum internal temperature of the column oven 3 after the feeding of the refrigerant based on the internal temperature detected by the temperature sensor 31, and stores the value as the decrement information 323 in the memory 32 in association with the time interval information 322 (Step S106).

FIG. 5B conceptually illustrates the temperature variation table stored in the memory 32, showing the state where information is stored in accordance with the periodical feeding of the refrigerant.

In the temperature variation table, the information about the calculated decrement of the internal temperature of the column oven 3 is stored in association with the time interval information in the upper row. For example, if the value calculated as ΔT after the refrigerant has been fed from the refrigerant feeder 8 into the column oven 3 is 1.2° C., the memory processing unit 333 stores the value "1.2° C." as the decrement information associated with 100 msec in the temperature variation table as shown in FIG. 5B. Specifically, the memory processing unit 333 stores, in the memory 32, the time interval information 322, which is 100 msec, in association with the decrement information 323, which is 1.2° C.

Thus, the time interval information 322 and the decrement information 323 are stored and associated with each other in the memory 32 using the temperature variation table.

While the analysis operation continues (the answer is NO in Step S107), Steps S103 to S106 are repeated to perform the control.

In Step S104, the temperature prediction unit 331 performs the determination based on the temperature variation table shown in FIG. 5B.

As a specific example, a situation where an additional period of 100 msec has passed after the lapse of a period of 100 msec will be described. In this situation, the temperature prediction unit 331 refers to the decrement information in the temperature variation table associated with 100 msec, because 100 msec has passed since the last feeding of the refrigerant started. As shown in FIG. 5B, the temperature variation table stores the value 1.2° C. as the decrement information associated with 100 msec. Thus, the temperature prediction unit 331 extracts the value 1.2° C. and substitutes the extracted value for ΔT in the formula (1).

The temperature prediction unit 331 substitutes the actual internal temperature Ta of the column oven 3 and the target temperature T stored in the memory 32 into the formula (1).

If a value obtained by subtracting ΔT (1.2° C.) only from the temperature Ta (left-hand value of the formula (1)) is more than or equal to the value obtained by subtracting 0.1° C. only from the target temperature (right-hand value of the formula (1)), i.e., the answer is YES in Step S104, the cooling controller 332 determines to feed the refrigerant. Specifically, if the temperature prediction unit 331 determines that the value obtained by subtracting ΔT from the temperature Ta is more than or equal to a reference value, which is the value obtained by subtracting 0.1° C. only from the target temperature, the cooling controller 332 determines to feed the refrigerant.

This means that if the internal temperature of the column oven 3, which is predicted based on the temperature variation table on the assumption that the refrigerant is fed from the refrigerant feeder 8, is more than or equal to the reference value, a determination is made to feed the refrigerant. Thus, when the temperature predicted by the temperature prediction unit 331 (Ta−ΔT) is more than or equal to the reference value, the predicted temperature falls within an allowable range.

Likewise, in response to the determination to feed the refrigerant, the cooling controller 332 opens the flow rate control valve 80 only for a predetermined time as described above (Step S105).

Then, based on the temperature detected by the temperature sensor 31, the memory processing unit 333 calculates the difference between the internal temperature of the column oven 3 during the feeding of the refrigerant and the minimum internal temperature of the column oven 3 after the feeding of the refrigerant as a value ΔT, and stores the value as the decrement information 323 in the memory 32 in association with the time interval information 322 (Step S106). In this step, if old information is present in the temperature variation table, the memory processing unit 333 rewrites the old information into new one.

For example, if the value calculated as ΔT after the refrigerant has been fed from the refrigerant feeder 8 into the column oven 3 is not 1.2° C., the memory processing unit 333 rewrites the decrement information associated with 100 msec in the temperature variation table into new information (not shown).

After Step S103, if the temperature prediction unit 331 determines that the value obtained by subtracting ΔT only from the temperature Ta (left-hand value of the formula (1)) is less than the value obtained by subtracting 0.1° C. only from the target temperature (right-hand value of the formula (1)), i.e., the answer is NO in Step S104, the cooling controller 332 determines not to feed the refrigerant. Thus, the cooling controller 332 periodically determines whether to feed the refrigerant or not based on the determination of the temperature prediction unit 331.

Based on the determination not to feed the refrigerant, the cooling controller 332 postpones the feeding of the refrigerant.

If the feeding of the refrigerant is postponed in this manner, a time interval between the start of the last feeding of the refrigerant (when the last determination to feed the refrigerant was made) and the start of the next feeding of the refrigerant (when the next determination to feed the refrigerant was made) is calculated. Then, in the temperature variation table, the information about the temperature decrement is stored in association with the information of the time interval.

FIG. 5C conceptually illustrates the temperature variation table stored in the memory 32, showing the state where information is stored when the feeding of the refrigerant is once postponed, and the refrigerant is fed thereafter.

For example, through the repeated control described above, suppose that NO is selected twice in a row in Step S104, YES is selected thereafter in Step S104, and then the flow rate control valve 80 is opened only for a predetermined time in Step S105. It is also supposed that the decrement ΔT of the internal temperature of the column oven 3 in this case is, for example, 1.6° C.

In such a case, the time interval between the start of the last feeding of the refrigerant (when the last determination to feed the refrigerant was made) and the start of the next feeding of the refrigerant (when the next determination to feed the refrigerant was made) is 300 msec.

Consequently, the memory processing unit 333 stores 1.6° C. as the decrement information associated with 300 msec in the temperature variation table as shown in FIG. 5C. Specifically, the memory processing unit 333 stores, in the memory 32, the time interval information 322, which is 300 msec, in association with the decrement information 323, which is 1.6° C.

Thereafter, the operation described above is repeated until the analysis operation is finished.

As can be seen, during the analysis operation by the gas chromatograph 1, the temperature variation table stored in the memory 32 is updated (rewritten as a latest one) in real time in accordance with the change of the internal temperature of the column oven 3. Then, the internal temperature of the column oven 3 is predicted based on the temperature variation table updated in real time (latest table), i.e., the time interval information 322 and the decrement information 323 in the memory 32. Further, based on the result of the prediction, whether to feed the refrigerant or not is determined. If it is determined to feed the refrigerant, the refrigerant is fed from the refrigerant feeder 8.

Thus, even if the amount of the refrigerant remaining in the cylinder storing the refrigerant or the temperature of the cylinder changes, the internal temperature of the column oven 3 can be predicted based on the latest information after the change, i.e., the time interval information 322 and the decrement information 323 in the memory 32, and the refrigerant can be fed based on the result of the prediction. In other words, even if the ambient environment changes, the refrigerant can be fed in accordance with the change. As a result, the internal temperature of the column oven 3 can be controlled with precision.

7. Advantages (1) According to this embodiment, the controller 33 includes the temperature prediction unit 331. The temperature prediction unit 331 predicts, on the assumption that the refrigerant is fed from the refrigerant feeder 8, the internal temperature of the column oven 3 (the left-hand value of the formula (1)) based on the time interval information 322 and the decrement information 323 (temperature variation table) in the memory 32.

Thus, the temperature prediction unit 331 can accurately predict the internal temperature of the column oven 3 when the refrigerant is fed from the refrigerant feeder 8.

If the refrigerant is fed from the refrigerant feeder 8 when the predicted internal temperature of the column oven 3 is suitable for the analysis operation, the internal temperature of the column oven 3 can be brought closer to an appropriate temperature.

As a result, the internal temperature of the column oven 3 can be controlled with precision. The gas chromatograph 1 can perform the analysis operation while precisely controlling the internal temperature of the column oven 3. Thus, the analysis can be performed with precision.

(2) Further, according to this embodiment, the controller 33 includes the cooling controller 332. Based on the determination of the temperature prediction unit 331 (Step S104), the cooling controller 332 opens the flow rate control valve 80 only for a predetermined time (Step S105).

This control can allow an appropriate amount of the refrigerant to be fed into the column oven 3 as compared to the case where the feed rate of the refrigerant is adjusted through the conventional feedback control.

As a result, the internal temperature of the column oven 3 can be controlled with precision.

(3) Moreover, according to this embodiment, the cooling controller 332 periodically determines whether to feed the refrigerant or not. If the internal temperature of the column oven 3 predicted by the temperature prediction unit 331 does not fall within the allowable range (the formula (1) does not hold), it is determined to postpone the feeding of the refrigerant from the refrigerant feeder 8 into the column oven 3, and the refrigerant is not fed. If the internal temperature of the column oven 3 predicted by the temperature prediction unit 331 falls within the allowable range, it is determined to feed the refrigerant, and the refrigerant can be fed.

This control can allow the refrigerant to be fed into the column oven 3 at an appropriate time.

(4) Further, according to this embodiment, the controller 33 includes the memory processing unit 333. The memory processing unit 333 stores, in the memory 32, the time interval information 322 and the decrement information 323, which are obtained when the feeding of the refrigerant is postponed, in association with each other.

This allows the memory 32 to store the time interval information 322 and the decrement information 323 in real time during the analysis operation, i.e., the temperature variation table can be updated in real time. The temperature prediction unit 331 can accurately predict the internal temperature of the column oven 3 because the prediction is performed based on the time interval information 322 and the decrement information 323 stored in real time in the memory 32.

(5) In addition, according to this embodiment, the refrigerant feeder 8 of the gas chromatograph 1 includes the internal feed pipe 83 as shown in FIG. 1. The internal feed pipe 83 extends in the column oven 3 toward the vicinity of the column 2.

Thus, the inside of the column oven 3 is cooled by the internal feed pipe 83 containing the refrigerant, and is further cooled by the refrigerant fed via the internal feed pipe 83. That is, the inside of the column oven 3 is cooled stepwise by the internal feed pipe 83 itself, and the refrigerant fed by the internal feed pipe 83.

As a result, the internal temperature of the column oven 3 can precisely be controlled by the refrigerant feeder 8.

In this configuration, the inside of the column oven 3 is abruptly cooled through the mere feeding of a small amount of the refrigerant. Thus, the control by the controller 33 becomes more effective.

(6) Furthermore, according to this embodiment, the internal feed pipe 83 extends between the heater 4 and the column 2 as shown in FIG. 1.

This configuration allows the internal feed pipe 83 containing the refrigerant to cool the space between the heater 4 and the column 2.

(7) Additionally, according to this embodiment, the internal feed pipe 83 is curved near the column 2 as shown in FIG. 1.

This configuration allows the internal feed pipe 83 containing the refrigerant to efficiently cool the atmosphere around the column 2.

(8) Moreover, according to this embodiment, the internal feed pipe 83 is curved to correspond to the shape of the column 2 as shown in FIGS. 1 and 2. Specifically, the outer shape of the internal feed pipe 83 is as large as that of the column 2, and thus, the internal feed pipe 83 and the column 2 are aligned with each other when viewed from the front.

This configuration allows the internal feed pipe 83 containing the refrigerant to efficiently cool the column 2 itself.

8. Second Embodiment

A gas chromatograph 1 according to a second embodiment of the present disclosure will be described below with reference to FIG. 7. Note that similar reference characters are used to designate elements similar to those of the first embodiment.

Figure 7:
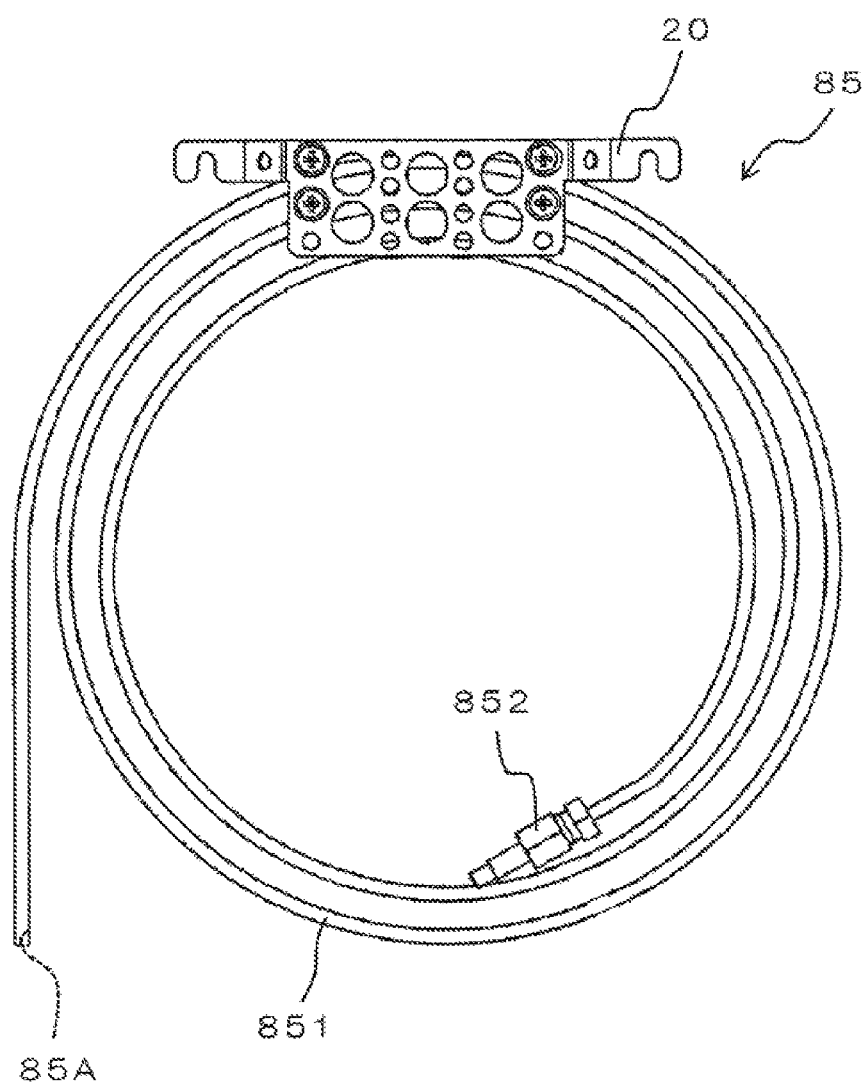
FIG. 7 is a front view illustrating an internal feed pipe used in a gas chromatograph according to a second embodiment of the present disclosure.

FIG. 7 is a front view illustrating an internal feed pipe 85 used in the gas chromatograph 1 according to the second embodiment of the present disclosure.

In the second embodiment, the internal feed pipe 83 of the refrigerant feeder 8 described above is replaced with the internal feed pipe 85. The internal feed pipe 85 is shaped differently from the internal feed pipe 83 of the first embodiment.

Specifically, the internal feed pipe 85 includes a tube 851 and a joint 852.

The tube 851 is a tubular member and wound in a spiral. Specifically, the tube 851 is curved downstream from an upstream end thereof to make circles so that the further downstream side is farther from the center of the circles. A downstream end of the tube 851 extends linearly downward. The downstream end (an end of the straight portion) of the tube 851 forms therein a discharge port 85A. A middle portion of the tube 851 is held by a fixing member 20. The joint 852 is attached to the upstream end of the tube 851.

The joint 852 is a long, cylindrical member. Space inside the joint 852 communicates with space inside the tube 851. A resistance pipe 82 is attached to a tip end (upstream end) of the joint 852.

The fixing member 20 is attached to the partition 9 (shown in FIG. 1) in the column oven 3. The fixing member 20 holds the internal feed pipe 85 (the tube 851). In this state, the discharge port 85A of the internal feed pipe 85 is oriented downward. Thus, the refrigerant discharged from the discharge port 85A is not directly sprayed onto the column 2, but hits a bottom wall of the column oven 3 to be spread inside the column oven 3.

The internal feed pipe 85, being held in the column oven 3, is provided adjacent to the column 2. Specifically, the tube 851 of the internal feed pipe 85 is opposed to the column 2, and is disposed along the column 2 inside the column oven 3.

Then, the refrigerant sent from the external feed pipe 81 into the column oven 3 passes through the external feed pipe 81, the flow rate control valve 80, and the resistance pipe 82, and then goes through the internal feed pipe 85. Thereafter, the refrigerant is discharged out of the discharge port 85A toward the bottom wall of the column oven 3.

As can be seen, according to the second embodiment, the tube 851 of the internal feed pipe 85 of the refrigerant feeder 8 is wound in a spiral. Thus, the tube 851 of the internal feed pipe 85 can be opposed to, and disposed along, the column 2 in the column oven 3.

This allows the internal feed pipe 85 to efficiently cool the column 2.

9. Variations

In the embodiments described above, it has been described that the refrigerant feeder 8 (refrigerant introducer) cools the inside of the column oven 3. Alternatively, the refrigerant feeder 8 (refrigerant introducer) may cool the sample vaporizing chamber of the sample introducer 6 or the detector 7 under the above-described control. If the gas chromatograph 1 includes a pretreatment unit, the refrigerant feeder 8 (refrigerant introducer) may cool the pretreatment unit under the above-described control. Specifically, the cooling target of the gas chromatograph 1 may be the sample vaporizing chamber of the sample introducer 6, the detector 7, or the pretreatment unit.

In the above-described embodiments, it has been described that the controller 33 periodically performs the determination based on the formula (1), and performs the control for feeding the refrigerant if the formula (1) holds. Alternatively, even if the formula (1) holds, the controller 33 may stop the feeding of the refrigerant until time when it is predicted that the temperature starts to fall passes after the feeding of the refrigerant.

Further, in the above-described embodiments, it has been described that the time interval information 322 and the decrement information 323 in the memory 32 are updated in real time, and the temperature prediction unit 331 predicts the internal temperature of the column oven 3 based on the information items in the memory 32. Alternatively, the temperature prediction unit 331 may predict the internal temperature of the column oven 3 based on plural time interval information items 322 and plural decrement information items 323 stored in advance in the memory 32.

Furthermore, in the above-described embodiments, it has been described that the internal feed pipes 83, 85 are provided adjacent to the column 2, in particular, behind the column 2 (between the column 2 and the heater 4). Alternatively, the internal feed pipes 83, 85 may be provided adjacent to the column 2, in particular, in front of the column 2 (on the side of the column 2 opposite to the heater 4).

What is claimed is:

1. A refrigerant introducer for cooling a cooling target provided for a gas chromatograph, the refrigerant introducer comprising:
    a refrigerant feeder comprising a flow rate control valve for intermittently feeding a refrigerant to the cooling target at predetermined time intervals;
    a memory storage electrically connected with a temperature sensor, and associating with one another, time intervals and a decrement of a temperature of the cooling target detected by the temperature sensor when the refrigerant has been fed to the cooling target at the time intervals; and
    a temperature prediction unit electrically connected to (i) the temperature sensor and (ii) the memory storage, the temperature prediction unit being programmed to predict the temperature of the cooling target based on a relationship between the time intervals and the decrement stored in the memory storage,
    wherein the flow rate control valve is configured to open based on the temperature of the cooling target predicted by the temperature prediction unit.

2. The refrigerant introducer of claim 1, further comprising:
    a cooling controller electrically connected to (i) the flow rate control valve and (ii) the temperature prediction unit, the cooling controller controlling the opening of the flow rate control valve and the feeding of the refrigerant from the refrigerant feeder to the cooling target based on the temperature of the cooling target predicted by the temperature prediction unit.

3. The refrigerant introducer of claim 2, wherein the cooling controller periodically determines whether to open the flow rate control valve to feed the refrigerant or not, and determines to postpone the feeding of the refrigerant from the refrigerant feeder to the cooling target if the temperature of the cooling target predicted by the temperature prediction unit does not fall within an allowable range.

4. The refrigerant introducer of claim 3, further comprising:
    a memory processing unit electrically connected to the memory storage and allowing the memory storage to store, and associate with one another, the time intervals extended due to the postponed feeding of the refrigerant, and the decrement of the temperature of the cooling target when the refrigerant has been fed to the cooling target at the extended time intervals.

5. A gas chromatograph comprising:
    a refrigerant introducer for cooling a cooling target for the gas chromatograph, a refrigerant feeder comprising a flow rate control valve for intermittently feeding a refrigerant to the cooling target at predetermined time intervals;
    a memory storage electrically connected with a temperature sensor, and associating with one another, time intervals and a decrement of a temperature of the cooling target detected by the temperature sensor when the refrigerant has been fed to the cooling target at the time intervals;
    a temperature prediction unit electrically connected to (i) the temperature sensor and (ii) the memory storage, the temperature prediction unit being programmed to predict the temperature of the cooling target based on a relationship between the time intervals and the decrement stored in the memory storage;
    a column oven into which the refrigerant is introduced from the refrigerant introducer, the flow rate control valve of the refrigerant introducer being configured to open and introduce the refrigerant based on the temperature of the cooling target predicted by the temperature prediction unit,
    the column oven being the cooling target, and the temperature sensor detecting an internal temperature of the column oven; and
    a column disposed in the column oven.

6. The gas chromatograph of claim 5, wherein the refrigerant feeder includes a feed pipe extending in the column oven toward the vicinity of the column, and having a discharge port through which the refrigerant is discharged.

7. The gas chromatograph of claim 6, further comprising:
    a heater disposed in the column oven to heat the inside of the column oven, wherein the feed pipe extends between the heater and the column.

8. The gas chromatograph of claim 6, wherein the feed pipe is curved in the vicinity of the column.

9. The gas chromatograph of claim 8, wherein the feed pipe is curved to correspond to a shape of the column.

10. The refrigerant introducer of claim 1, wherein the decrement is a difference between a temperature of the cooling target when the refrigerant is being fed and a minimum temperature of the cooling target after the feeding of the refrigerant.

11. The refrigerant introducer of claim 1, wherein the temperature prediction unit is programmed to predict a temperature of the cooling target on the assumption that the refrigerant is fed from the refrigerant feeder.

* * * * *